(12) United States Patent
Patlakh et al.

(10) Patent No.: US 6,480,659 B1
(45) Date of Patent: Nov. 12, 2002

(54) OPTIC FIBER STRUCTURE FOR EFFICIENT USE OF OPTICAL PUMP ENERGY IN THREE-LEVEL RARE-EARTH DOPED FIBER LASER

(75) Inventors: Anatoly Patlakh, Holon (IL); Vladimir V. Solodovnikov, Shkolinry (RU)

(73) Assignee: Rayteq Photonic Solutions Ltd., Rehovot (IL)

(*) Notice: Subject to any disclaimer, the term of this patent is extended or adjusted under 35 U.S.C. 154(b) by 0 days.

(21) Appl. No.: 09/987,397

(22) Filed: Nov. 14, 2001

(51) Int. Cl.[7] ............................. G02B 6/02; H01S 3/30
(52) U.S. Cl. .................... 385/125; 385/123; 385/126; 372/6
(58) Field of Search .................. 385/123, 124, 385/125, 126, 127, 141; 372/6

(56) References Cited

U.S. PATENT DOCUMENTS

| | | | | |
|---|---|---|---|---|
| 4,315,666 A | * | 2/1982 | Hicks, Jr. ............... | 385/42 X |
| 4,815,079 A | * | 3/1989 | Snitzer et al. ........... | 372/6 |
| 5,224,188 A | * | 6/1993 | Vali ....................... | 385/96 |
| 5,533,163 A | * | 7/1996 | Muendel ................. | 385/126 |
| 5,802,236 A | * | 9/1998 | DiGiovanni et al. ..... | 385/127 |
| 5,907,652 A | * | 5/1999 | DiGiovanni et al. ..... | 385/125 |
| 6,031,849 A | | 2/2000 | Ball et al. ............... | 372/6 |
| 6,097,870 A | * | 8/2000 | Ranka et al. ............ | 385/127 |
| 6,157,763 A | | 12/2000 | Grubb et al. ............ | 385/126 |

OTHER PUBLICATIONS

M.J. Adams, "An Introduction to Optical Waveguides", John Wiley and Sons, NY, 1981.

* cited by examiner

Primary Examiner—Brian Healy
(74) Attorney, Agent, or Firm—Oliff & Berridge, PLC (57) ABSTRACT

A fiber optic structure for efficient pumping of a rare-earth element fiber laser, such as an Ytterbium fiber laser, operating at the three-level transition. In order to operate at the three-level transition, a large amount of pumping energy must be effectively coupled from the fiber's inner cladding into the rare-earth element-doped core. The present invention discloses the use of eccentric asymmetric, and non-cylindrical inner claddings to maximize the overlap of the pumping energy of multi-mode field distribution patterns with the fiber core and to maximize the number of intersections of the pumping optical ray trajectories with the core. While the cladding surrounding the core is eccentric with respect to the core, the core itself is coaxial with the outer cladding for compatibility in coupling to standard transmission fibers. Also disclosed is the use of air claddings and methods for optimal sizing of the capillaries. In addition, the creation of regions of differing index of refraction in the cladding is disclosed, to further enhance mode conversion of pumping energy.

8 Claims, 10 Drawing Sheets

OPTIC FIBER STRUCTURE FOR EFFICIENT USE OF OPTICAL PUMP ENERGY IN THREE-LEVEL RARE-EARTH DOPED FIBER LASER

FIELD OF THE INVENTION

The present invention relates to a fiber lasers and, more particularly, to rare-earth element-doped fiber lasers operating at the three-level transition, and to fiber optic structures for fiber lasers.

BACKGROUND OF THE INVENTION

Optical communication networks demand high transmission speeds, wide bandwidth, and great channel capacity. Another important requirement is for reliable signal transmission at an appropriate optical power level for good signal detection after tens of kilometers of signal travel. Optical signals transmitted in a network are typically optically amplified after each 10 to 15 kilometers of transmission path. The amplification is performed by optical amplifiers, which represent a single or double clad fiber structure with the fiber core doped by rare earth elements. The optical signals carrying information travel through the fiber core. In order to perform the amplification, high power optical pumping radiation is also introduced into the fiber core by direct coupling to it or through the cladding. The pumping radiation raises the energy levels of the doping to enable amplification of the signal through stimulated emission. It is noted that the amplifiers are separate from the fibers used for signal transmission. Such amplifiers are made of fibers approximately ten to fifteen meters in length.

In conventional single-mode fibers, the wavelength of minimum loss is around 1.5 micrometers. The ability to amplify this wavelength is therefore extremely important in fiber optic networks. Erbium Doped Fiber Amplifiers (EDFA), when operated in the so-called "three-level mode" and pumped at a wavelength of approximately 980 nanometers, have the capability of amplifying signals of the required 1.5-micrometer wavelength. For efficient optical amplification, EDFA's in turn require high power single-mode coherent pumping at a wavelength close to 980 nanometers.

Ytterbium (Yb) doped fiber lasers are sources of high power, high brightness, single mode coherent approximately 980-nanometer optical radiation, provided they are operated at a three-level transition and not at their more-easily attained four-level transition. Operation of an Yb doped fiber laser at a three-level scheme presents a number of problems. One of the problems is the significant absorption loss of the three-level emission peak at about 980 nanometers. To overcome, these absorption losses and lase at approximately 980 nanometers the Yb doped fiber must be "bleached"; that is, more than 50% of all Yb ions must be excited to the upper excitation state.

Although various attempts have been made to produce Yb lasers operating at a three-level transition, there are no cost-effective, high-power, single transverse-mode, Ytterbium pump sources currently-available. Generally, three-level operation in an Ytterbium fiber laser is achieved in two ways:

a) by increasing the efficiency of the coupling of pumping radiation into the cladding; and b) by improving absorption of the coupled pumping radiation into the Yb-doped core.

Increased coupling of the pumping radiation to the cladding is attained primarily by using air-clad fibers with a high numerical aperture (NA). Improving the absorption of the coupled pumping radiation by the doped fiber core is typically achieved by a fiber geometry that encourages the optical path of the pumping energy to cross the fiber core as much as possible. Additional pumping energy is absorbed by the core each time such a crossing occurs.

Figure 1:
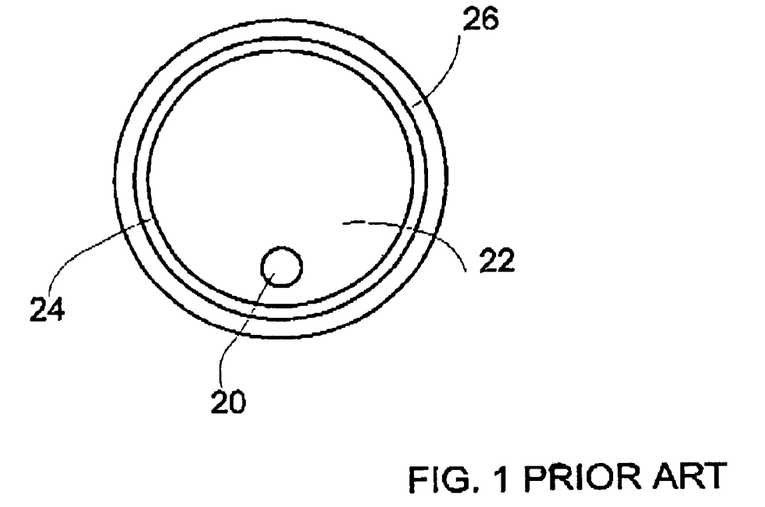
FIG. 1 illustrates a cross-section of a prior-art fiber structure useful in improving pumping efficiency by increasing fiber core absorption.

U.S. Pat. No. 4,815,079 to Snitzer et al. (herein denoted as "Snitzer"), which is incorporated by reference for all purposes as if set forth fully herein, discloses a clad pumped fiber laser where the improvement of absorption of the coupled pumping radiation by doped fiber core was obtained by placing the fiber core off-center relative to the cladding. FIG. 1 illustrates this geometry. A fiber core 20 is surrounded by a first inner cladding 22, a second inner cladding 24, and an outer cladding 26. The reasoning behind the off-center placement is that when pumping is characterized by multi-mode operation, it is well-known in the art that the radial distribution of the pumping energy in inner cladding 22 is such that a large part of the pumping energy is located away from the center of inner cladding 22, and that to maximize the absorption of pumping energy, fiber core 20 should also be located away from the center. It is noted that the term "inner cladding" herein denotes any cladding that is interior to the outer cladding of a fiber. A fiber may have more than one inner cladding, as is illustrated in FIG. 1 with a first inner cladding 22 and a second inner cladding 24. The term "outer cladding" herein denotes a cladding whose outer surface is the exterior surface of the fiber. A fiber can have at most one outer cladding, as is illustrated in FIG. 1 with outer cladding 26.

Although the prior-art structure illustrated in FIG. 1 is efficient in coupling pumping radiation into the core, an off-center fiber structure is not practical since optical transmission lines and networks typically have a coaxial structure, and connecting coaxial transmission lines to an off-center amplifier such as that of the prior art (FIG. 1) is extremely difficult.

Figure 2:
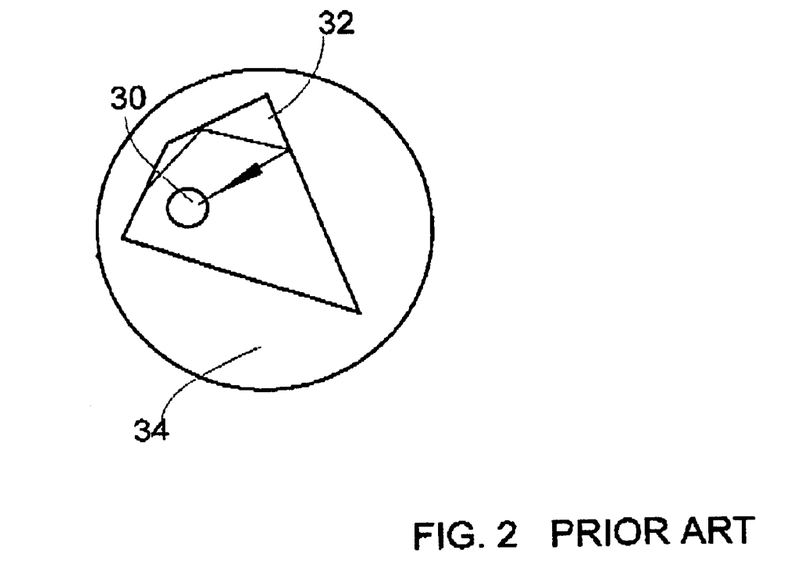
FIG. 2 illustrates a cross-section of another prior-art fiber structure useful in improving pumping efficiency by increasing fiber core absorption.
Figures 3A, 3B, 3C:
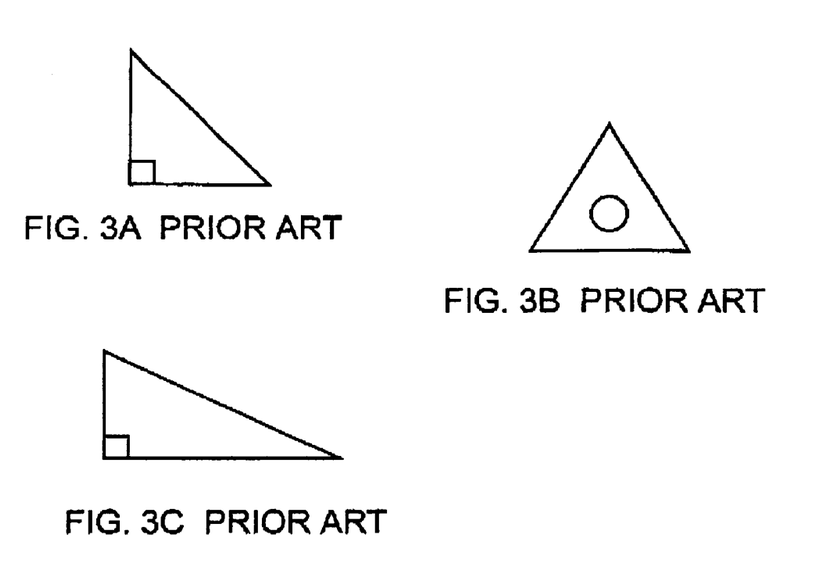
FIGS. 3A, 3B and 3C illustrate cross-sections of additional prior-art fiber structures useful in improving pumping efficiently by increasing fiber core absorption.

Improving absorption of the pumping radiation in the Yb-doped fiber core is also achieved by increasing the number of places the pumping energy's optical path crosses the fiber core. U.S. Pat. No. 5,533,163 to Muendel (herein denoted as "Muendel"), which is incorporated by reference for all purposes as if set forth fully herein, teaches use of cladding having non-cylindrical shapes. FIG. 2 shows such a geometry. A cylindrical single-mode fiber core 30 is surrounded by an inner cladding 32 in the form of a non-rectangular, convex polygon so that the propagating pump energy is induced to form an essentially uniform radiation field in which the various radiation modes comprising the pump energy are isotropically distributed. A cylindrical outer cladding 34 presents an overall cylindrical shape externally. A variety of additional cladding shapes, some of which are shown in FIGS. 3A, 3B and 3C, are also disclosed by Muendel. Muendel teaches criteria for proper convex polygon selection and generally states that good results may are obtained by use of any k-sided convex polygon that satisfies the condition:

$$\theta = 360°/k \qquad (1)$$

where $\theta$ is the central angle and $k \geq 3$.

Muendel discloses that fibers with off-center structure and irregular polygons are especially advantageous. Fabrication of a fiber optic structure in accordance with the invention is accomplished by machining a preform to the desired cross section and then drawing the preform according to techniques known in the art. Such preparation of a preform and machining of multiple facets on the preform, however, are operations that undesirably complicate fiber fabrication.

The term "cylindrical" herein denotes any surface describable as the normal (perpendicular) locus of a circle along an axis. As used herein, such an "axis" need not be a straight line segment, and may even be a closed curve. Thus, as the term "cylindrical" is used herein, a drawn fiber optic structure may have a cylindrical external surface even when deformed or bent so as not to correspond to the mathematically developable surface of a right cylinder of rotation. The term "coaxial" as used herein denotes a relationship between two or more cylindrical surfaces having the same axis and corresponding to loci of circles of different diameters. The cross-section of such a cylindrical surface normal to the axis is a circle.

U.S. Pat. No. 6,031,849 to Ball et al. (herein denoted as "Ball"), which is incorporated by reference for all purposes as if set forth fully herein, discloses a double-clad Yb fiber laser operating at a three-level transition at approximately 980 nanometers, along with a method of manufacturing the fiber. In order to enhance the pumping energy coupling efficiency, the form of the laser's inner cladding matches the geometry of the pump source, which is the emitting area of a powerful single stripe, broad area diode. The rectangular form of the cladding improves core absorption of the pumping energy. Fabrication of such a fiber laser, however, is complicated because the fiber core has a round form whereas the inner cladding is rectangular. The preform rod should be slot ground with equal and opposing slots around one axis of the inner core. This, too, is a complicated operation.

U.S. Pat. No. 6,157,763 to Grubb et al., which is incorporated by reference for all purposes as if set forth fully herein, discloses a double-clad optical fiber that has an inner cladding with a cross-sectional shape that is non-circular, but which maintains a good end-coupling profile. The cross-sectional shape of the inner cladding is such that two perpendicular distances across the shape, each of which passes through a geometric center of a core of the fiber, are equal for all angular positions. The shape of the preferred embodiments is such that the flat surfaces of the cladding are at right angles to each other along the outside boundary of the shape, and are created by abrading away the surface of a cylindrical inner cladding of a glass preform of the fiber. Additional surface abrading operations complicate fiber production, so that this approach is difficult.

U.S. Pat. No. 5,907,652 to DiGiovanni, et al., which is incorporated by reference for all purposes as if set forth fully herein, discloses a method of coupling pumping energy from low brightness sources (such as diode arrays) into the inner cladding of a double-clad fiber, taking advantage of the inner cladding's large cross-sectional area and high numerical aperture (NA). As the multi-mode pump light crosses the core, it is absorbed by the rare-earth dopant. The geometry presented in DiGiovanni is coaxial, although it is also said to be possible to increase the overlap of the pump light with the core by making the inner cladding elliptical. The high numerical aperture of the inner cladding is achieved by using an air cladding having a low effective refractive index.

Despite all of the above-described prior-art efforts and the need, there are no commercially available, cost-effective Ytterbium fibers lasers operating at the desired three-level transition. There is thus a widely-recognized need for, and it would be highly advantageous to have, an efficient and cost-effective cladding-pumped Ytterbium-doped fiber laser operating reliably at a three-level transition. In particular, there is a need for an Yb-doped fiber laser that can be directly pumped by regular laser diodes, provide high power single mode output at approximately 980 nanometers, and maintain high slope efficiency. This goal is met by the present invention.

SUMMARY OF THE INVENTION

An object of the present invention is to provide an efficient and cost-effective cladding-pumped rare-earth element-doped fiber laser operating reliably at a three-level transition and operating at high power single mode output in the range of approximately 980 nanometers.

It is a further object of the present invention to provide a high numerical aperture air-clad fiber structure enabling easy coupling with optical radiation pumping sources.

It is still a further object of the present invention to provide an air-clad fiber supporting cylindrical fiber geometry and enhancing the efficient utilization of pumping energy and absorption within a cylindrical coaxial fiber core.

It is yet an additional object of the present invention to provide a method of cost-effective manufacturing of an air-clad fiber structure that enhances the efficient mode conversion process within the fiber core and inner cladding.

These and other objectives of the invention are attained by providing a fiber optic structure with a geometry that features a cylindrical fiber core which is coaxial with a cylindrical outermost cladding, and where the fiber core is surrounded by at least one eccentric inner cladding. The terms "eccentric" and "eccentricity" herein denote any geometric and/or optical properties for a cladding which does not exhibit full rotational symmetry, including, but not limited to: forms whose mathematical centers of mass are radially displaced from the axis of the cylindrical outermost cladding; forms whose geometrical or optical properties vary according to the azimuthal angle with respect to the fiber axis; forms whose geometrical or optical properties have a rotational aperiodicity with respect to the fiber (that is, relative to a polar coordinate system associated with the fiber, or a cross-section thereof); and forms which are non-cylindrical. The present invention provides a number of embodiments of eccentricity in such fiber optic structures, including air-claddings with variably-sized and/or variably-placed capillaries, as well as regions of altered refractive index. Because the cladding is eccentric and/or irregularly-shaped, a fiber laser according to the present invention benefits from improved coupling of the pumping energy field's modal distribution pattern within this eccentric and/or irregularly-shaped cladding into the core. But because the core is cylindrical and coaxial, signals into and out of the core are easily coupled out of and into standard coaxial transmission fibers. Thus, a fiber optic structure according to the present invention overcomes prior-art limitations. It is also noted that the principles of the present invention are applicable in cases involving fiber doping by rare-earth elements in general. For convenience in discussion, the present invention is described in terms of the non-limiting case of Ytterbium doping. The present invention is also useful for fiber lasers doped with other rare-earth elements.

Ytterbium-doped fiber laser operation at the three-level transition is enabled by efficient mode conversion that increases the absorption of pump radiation by the Ytterbium-doped fiber core. In embodiments of the present invention utilizing air cladding, the interface between the inner cladding and the air cladding or air channels is not a smooth one. Air holes influence the interface so that it becomes "flower-like" in some cases, or asymmetric and irregular in other designs. This interface stimulates mode conversion from inefficient ring modes propagating at the periphery (and located far from the fiber core) to modes that have a high overlap with the Ytterbium-doped fiber core. Pumping power absorption is thereby increased to a level that surpasses the Yb bleaching threshold, enabling efficient operation at the three level transition.

A fiber optic structure according to the present invention can be used with an optical energy pumping source and with an Ytterbium doped core, to provide an optical fiber laser. For example, an optical fiber laser system according to the present invention that operates at approximately 980 nanometers may be pumped by one or more solid state laser diodes. Normally, such a fiber would have a number of claddings in addition to the eccentric and/or irregularly-shaped cladding a described above, and there would also be means for coupling the optical pumping source into the fiber. The core emits stimulated radiation of the desired wavelengths according to the excitation provided by the optical pumping.

In accordance with present invention a fiber optic structure may have at least one of the claddings as an air cladding between the innermost cladding and the outermost cladding, where the air cladding is formed and sized so as to be eccentric with respect to the outer cylindrical cladding. Moreover, such air cladding can be of hollow capillaries of various diameters, whose refractive index is selected according to the inequality $n_{core} > n_{inner\ cladding} > n_{capillary} > n_{outer\ cladding}$. Furthermore, the fiber may have an inner cladding of photosensitive material which has been UV-treated to have regions with different refractive indices. Such UV-treating of photosensitive material to produce regions of altered refractive index is well-known in the art, and is commonly used, for example, to produce reflective Bragg gratings. According to the present invention, UV treatment also contributes to more efficient mode conversion.

BRIEF DESCRIPTION OF THE DRAWINGS

The invention is herein described, by way of non-limiting examples only, with reference to the accompanying drawings, wherein.

DETAILED DESCRIPTION OF THE EMBODIMENTS

The principles and operation of an optic fiber structure according to the present invention may be understood with reference to the drawings and the accompanying description.

Figure 4:
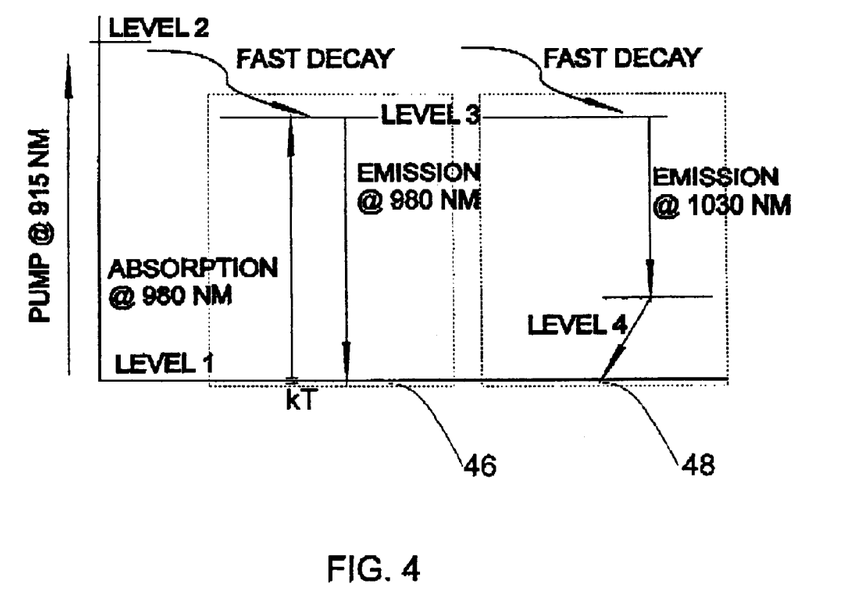
FIG. 4 is an energy-level diagram illustrating four-level and three-level Ytterbium laser energy levels and transitions.

Ytterbium lasers can operate at a four-level transition to output radiation with a wavelength of near 1100 nanometers, and can operate at a three-level transition to output radiation with a wavelength of approximately 980 nanometers. FIG. 4 is an energy-level diagram illustrating both four-level and three-level Ytterbium laser transition characteristics and operation. Stable Ytterbium laser operation at a three-level transition 46 is more difficult to achieve than operation at a four-level transition 48. This difficulty is due primarily to the re-adsorption of the three-level laser transition output by the doped fiber core at approximately a 980 nanometer wavelength. This absorption loss may be overcome by a process known in the art as "bleaching", or excitation of more than 50% of all Ytterbium ions to the upper level. The optical pumping power required to attain this fiber bleaching condition is well-defined and formulated in Ball (Equation 8).

Earlier it was noted that attaining the bleaching condition for an Ytterbium laser to operate at a three-level transition may be facilitated in two ways:

a) by increasing the efficiency of the coupling of pumping radiation into the cladding; and b) by improving absorption of the coupled pumping radiation into the Yb-doped core.

The present invention deals primarily with the latter issue, by providing fiber geometry that enhances the absorption of pumping radiation by the fiber core.

Double-clad fibers have significantly higher numerical apertures than single clad fibers and thus couple larger pump energy into the fiber. This is why double-clad fibers predominate in fiber lasers. Furthermore, among double-clad fibers the air-clad fibers are in a separate class by themselves, and have the highest numerical apertures.

Absorption of pump radiation by the fiber core generally depends on two factors. The first factor is the density of intersection of the fiber core by pump radiation propagating in the inner cladding. The second factor is the pumping energy density distribution adjacent to, and overlapping, the fiber core. The contribution of the pumping energy distribution may be improved by converting from modes that propagating relatively far away from the fiber core to modes that are close or overlap the fiber core and which are therefore more easily absorbed by the core. The importance of fiber cross section geometry for mode conversion process is emphasized in both Snitzer and Muendel.

The current invention addresses the issue of fiber cross-section design. Optimizing fiber cross-section design may influence both the first and the second factors involved in the absorption of pump radiation by the fiber core. Since air-clad fibers have a higher numerical aperture than regular double-clad fibers, the optimization according to the present invention is demonstrated with the non-limiting case of air-clad fibers. It is noted, however, that the principles of the present invention apply to the use of other types of cladding as well.

Figure 5A:
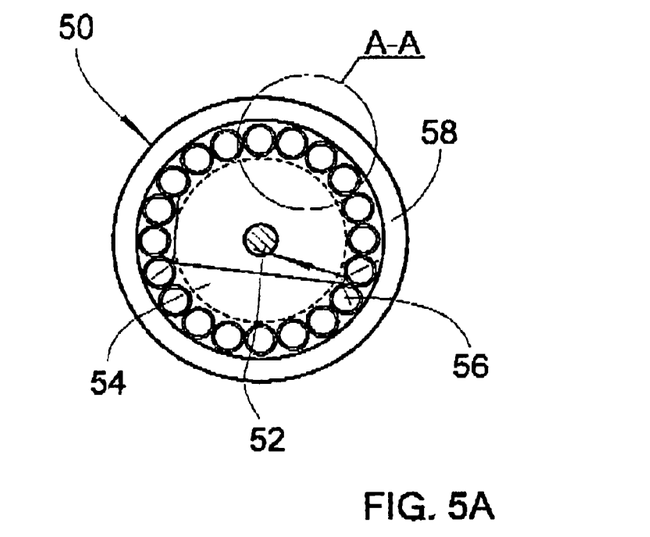
FIG. 5A illustrates a cross-section of a multiple air-cladding fiber cross-section showing the fiber structure.

FIG. 5A illustrates a cross-section of an air-clad fiber 50 with a single mode fiber core 52, an inner cladding 54, an air cladding made up of many hollow capillaries 56, and an outer cladding 58. Fiber core 52 may be doped with a rare earth element. As in any double-clad fiber, the values of the refractive indices n of the fiber core and the claddings are selected according to the well-known condition for total internal reflection:

$$n_{core} > n_{inner\ cladding} > n_{outer\ cladding} \quad (2)$$

Figure 5B:
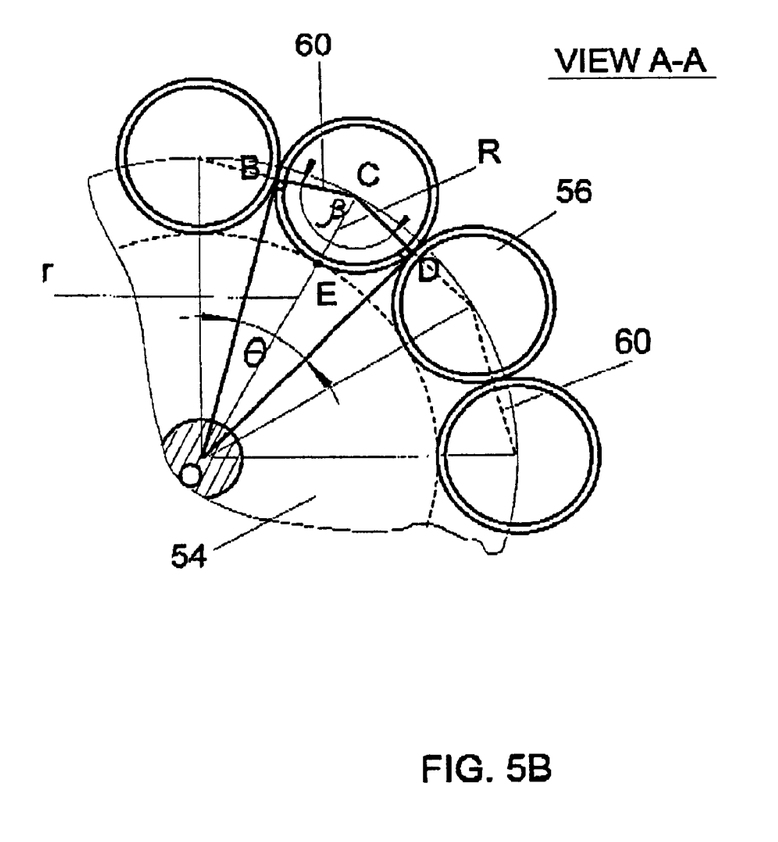
FIG. 5B is an enlargement of a view A—A in FIG. 5A, indicating the parameters used in fiber design optimization.

It is well-known that optical radiation propagates along the fiber by total internal reflection. Typically, the optical path of radiation is indicated by tracing ray propagation as reflections from different points within the fiber (such as in FIG. 2). The cross section of fiber 50 created by air cladding 56 in terms of geometric optics is equivalent to a convex polygon. FIG. 5B is an enlargement of view A—A (FIG. 5A) of air cladding 56 and inner cladding 54 indicating virtual or imaginary facets such as a facet 60 of the k-sided convex polygon. Selecting the minimal length of facet or capillary diameter is performed according to present invention by applying the following principles.

Angle θ is a central angle which may be found according to Equation (1) as previously noted and as disclosed in Muendel. $θ=360°/k$, where $k≥3$. Polygon OBCD is a closed polygon with side BC and side CD equal in length to radius R of a capillary forming air cladding 56. Lines OB and OD are tangential to chords 60 at points B and D, respectively, and hence angles OBC and ODC are 90°. Angle β in this case would be $β=(360−180−θ)$. The radius of inner cladding 54 is denoted as r. The length of line OEC is equal to the sum of the radii of inner cladding 54 and capillary 56, and OEC bisects angles β and θ. Capillary radius R can be easily found as $R=r(\cos(β/2)/(1−\cos(β/2)))$. The table below shows possible capillary diameters, creating the optical equivalent of a convex polygon, and thereby promoting efficient mode conversion. For the purpose of illustration only it is assumed that the inner cladding radius is 12.5 micron, and outer cladding radius is 62.5 microns.

TABLE 1

| Num. capillaries (facets) | θ (Degrees) | β/2 (Degrees) | R (microns) |
|---|---|---|---|
| 3 | 120.00 | 30.00 | 80.8 |
| 4 | 90.00 | 45.00 | 30.2 |
| 5 | 72.00 | 54.00 | 17.8 |
| 6 | 60.00 | 60.00 | 12.5 |
| 8 | 45.00 | 67.50 | 7.7 |
| 9 | 40.00 | 70.00 | 6.5 |
| 10 | 36.00 | 72.00 | 5.6 |
| 12 | 30.00 | 75.00 | 4.4 |
| 15 | 24.00 | 78.00 | 3.3 |
| 18 | 20.00 | 80.00 | 2.6 |
| 20 | 18.00 | 81.00 | 2.3 |
| 30 | 12.00 | 84.00 | 1.5 |
| 36 | 10.00 | 85.00 | 1.2 |
| 40 | 9.00 | 85.50 | 1.1 |
| 45 | 8.00 | 86.00 | 0.9 |
| 60 | 6.00 | 87.00 | 0.7 |
| 72 | 5.00 | 87.50 | 0.6 |
| 90 | 4.00 | 88.00 | 0.5 |
| 120 | 3.00 | 88.50 | 0.3 |
| 180 | 2.00 | 89.00 | 0.2 |
| 360 | 1.00 | 89.50 | 0.1 |

The smallest capillary diameter should satisfy the efficient mode conversion condition, including the highest azimuthal mode. The highest number m of azimuthal mode existing in a fiber is related to the fiber geometry (see *An Introduction to Optical Waveguides*, M. J. Adams, John Wiley and Sons, N.Y., 1981) as:

$$m \sim r(2\pi/\lambda)NA$$

Where:

λ is the pumping radiation wavelength r is the inner cladding radius, and

NA—is the numerical aperture of the fiber

The highest number m of azimuthal mode existing in a fiber with a cladding radius of 12.5 microns, pumping wavelength λ of about 1 micron and NA=0.55 would be 86.4. Minimum capillary radius R accordingly would be 0.909 micron. This sets the lower limit on the maximum number of capillaries at 40, with a diameter of about 2.2 microns.

To determine the minimum practical number of capillaries that would produce a similar mode conversion effect, it is first noted that an exemplary air-clad fiber may have a core diameter of approximately 3–9 microns. Around this core is an (inner) air-cladding with an outside diameter of approximately 113 microns, and around the air-cladding is an outer (solid) cladding with an outside diameter of approximately 125 microns (which is therefore the outside diameter of the fiber). The thickness of the air-cladding is therefore approximately (113−25)/2=44 microns, thereby determining the maximum capillary diameter of about 44 microns. Referring to Table 1, above, it is seen that the largest value of R equal to or less than 44 microns corresponds to 4 capillaries. Thus, the minimum number of capillaries for such a fiber air-cladding is 4.

Fabrication of such a fiber is relatively a simple and straightforward process using prior-art methods. The fiber core and inner cladding are formed in a conventional fashion. The required number of hollow silica glass capillary tubes with the minimum diameter corresponding to the efficient mode mixing criteria are placed around inner clad in contact therewith, and the assembly is overlaid by another silica tube serving as the outermost cladding. The entire assembly is drawn simultaneously in a conventional manner.

In order to understand how the invention operates, several exemplary and non-limiting examples are described below.

Figure 6:
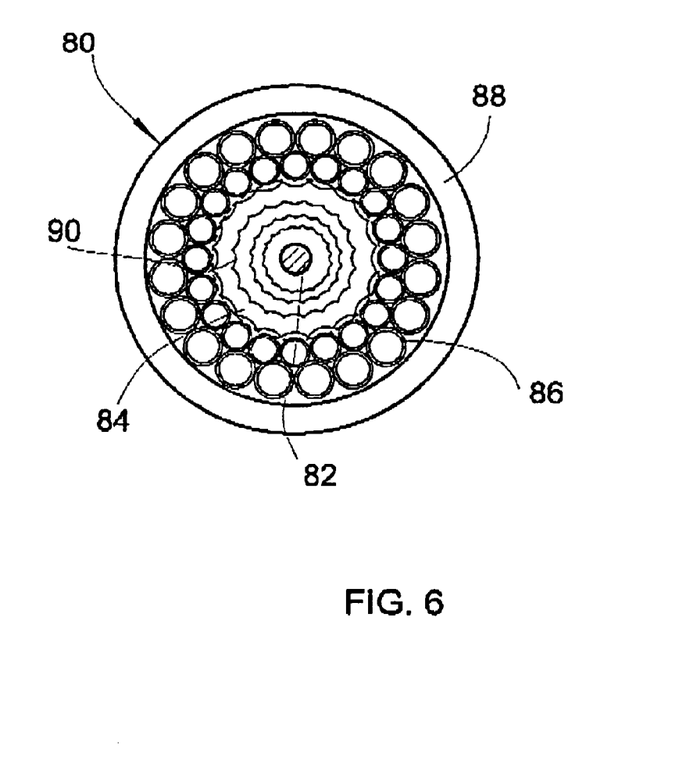
FIG. 6 illustrates a cross-section of a fiber according to the present invention, having a cylindrical core coaxial with the cylindrical exterior surface of an outermost cladding and an air cladding between the core and the outermost cladding.

Shown in FIG. 6 is a cross-section of an air-clad fiber 80 according to these guidelines. Fiber 80 has a single-mode fiber core 82, an inner cladding 84, an air cladding 86 and an outer cladding 88. Fiber core 82 may be an Ytterbium-doped fiber. This particular design has an optimized numerical aperture and provides efficient mode conversion, although it does not eliminate presence of ring modes that do not contribute to fiber core pumping efficiency (see below). FIG. 6 also shows an optical modal field distribution pattern 90 within inner cladding 84. It should be noted that for efficient mode mixing, the smallest capillary diameter of air cladding 86 is selected in accordance with the foregoing principles. The condition of Inequality (2) on the refractive indices of fiber core 82, inner cladding 84, and outer cladding 88 applies in this structure also. Further performance improvement is possible by utilizing capillaries forming the air cladding that have a refraction index lower than inner cladding 84–$n_{core} > n_{inner\ cladding} > n_{capillary} > n_{outer\ cladding}$.

Figure 7:
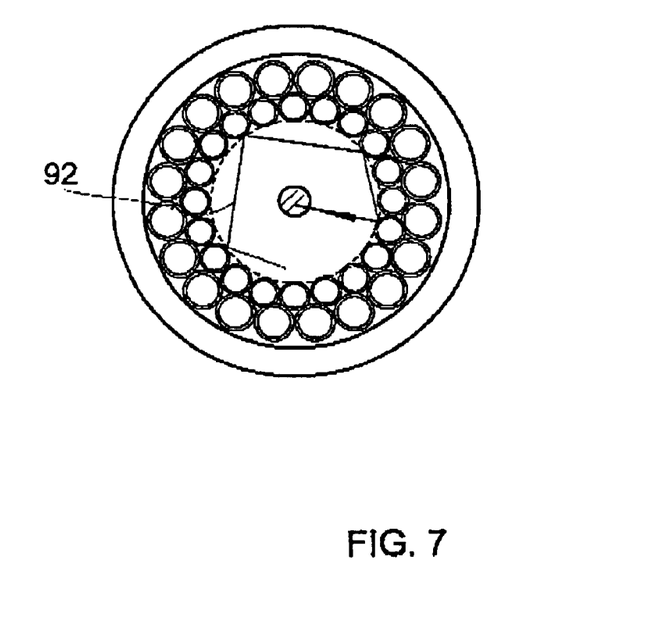
FIG. 7 illustrates a cross-section of a fiber as in FIG. 6 with an optical ray traced in accordance with the laws of geometrical optics.

FIG. 7 illustrates the fiber as shown in FIG. 6, and having an optical radiation path 92 in the inner cladding and single mode fiber core as established by the total internal reflection laws and principles of geometric optics.

Figure 8:
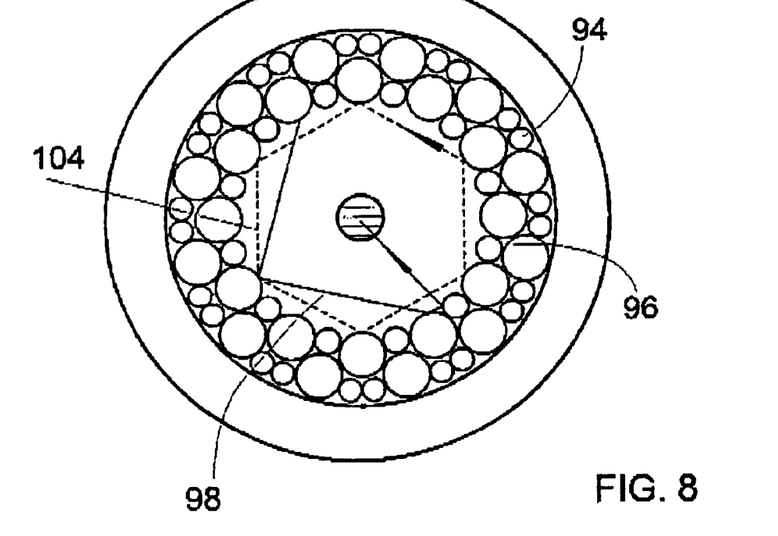
FIG. 8 illustrates a cross-section of a fiber according to the present invention, having a cylindrical core coaxial with the cylindrical exterior surface of an outer cladding and an air cladding between the core and the outermost cladding, wherein the air cladding has hollow capillaries of different diameters.
Figure 9:
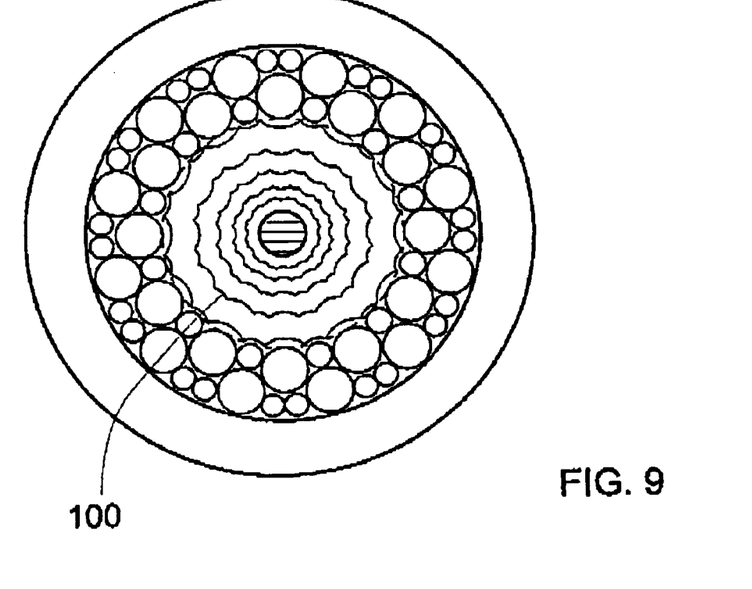
FIG. 9 illustrates a cross-section of a fiber as in FIG. 8, and also illustrating a modal field distribution pattern.

According to the present invention it is also possible to use different diameters of hollow silica capillary tubes, with the smallest diameter corresponding to the efficient mode mixing criteria as detailed above. FIG. 8 shows the cross-section of a fiber constructed according to these criteria. A capillary 94 has the minimum allowable diameter, whereas a capillary 96 has a diameter larger than the minimum. An optical radiation path 98 in the inner cladding and fiber core is established by total internal reflection and the principles of geometric optics. FIG. 9 illustrates the same cross-section as in FIG. 8, and also shows a modal field distribution pattern 100. Capillary diameters are selected according to the rules for efficient mode conversion, as set forth previously. This fiber structure efficiently reduces another limitation of convex polygon cross section fibers in the embodiment of FIG. 6. In a fiber having a polygonal cross-section, multiple reflections at an angle equal to the polygon angle are denoted as "ring modes", such as a ring mode 104 in FIG. 8. Ring modes do not converge and will continue propagating along the length of the fiber far away from the core, without crossing the fiber core. Energy in ring modes therefore is not absorbed by the core and thus the presence of ring modes degrades pumping efficiency. In the "star" type of inner cladding shown in FIG. 8, multiple star edges are created by different capillary diameters, and the reflection angle continuously changes value. Thus an air cladding consisting of hollow capillaries of different diameters suppresses ring modes and more efficiently stimulates mode conversion.

Snitzer and Muendel teach that a displaced core better absorbs pump radiation, since the core displacement creates conditions for more frequent intersections of reflected radiation. The amount of displacement required is determined by the condition that a substantial amount of radiation propagating in the inner cladding be coupled into the fiber core. In the prior art, this is achieved by physically displacing the core within the inner cladding and creating an eccentric inner core configurations, as illustrated, for example, in FIG. 1. D-shaped, rectangular and other different shapes of inner cladding exist. Shaping the inner cladding in such a manner, however, complicates fiber production and results in a fiber that is not compatible with the coaxial structure of standard optical transmission channels. Thus, prior-art displaced fiber cores are complicated and difficult to interconnect to network transmission lines.

The present invention overcomes these prior-art limitations by incorporating an eccentric or asymmetric inner cladding, wherein the modal field distribution pattern is offset or displaced with respect to the fiber core, but wherein the fiber core remains coaxial with the exterior surface of the outermost cladding. In the non-limiting examples presented, the eccentric or asymmetric inner cladding is an air cladding. Fiber optic structures according to the present invention are characterized by modal field distribution patterns that couple energy into the core more efficiently than prior-art fibers. In addition, designing a fiber optic structure according to the present invention allows more precise control of the offset of the modal field distribution pattern, thereby making it possible to create regions of increased pumping energy concentration along the fiber's length. A fiber optic structure according to the present invention may thus be designed so that regions of high pumping energy overlap the fiber core.

Figure 10:
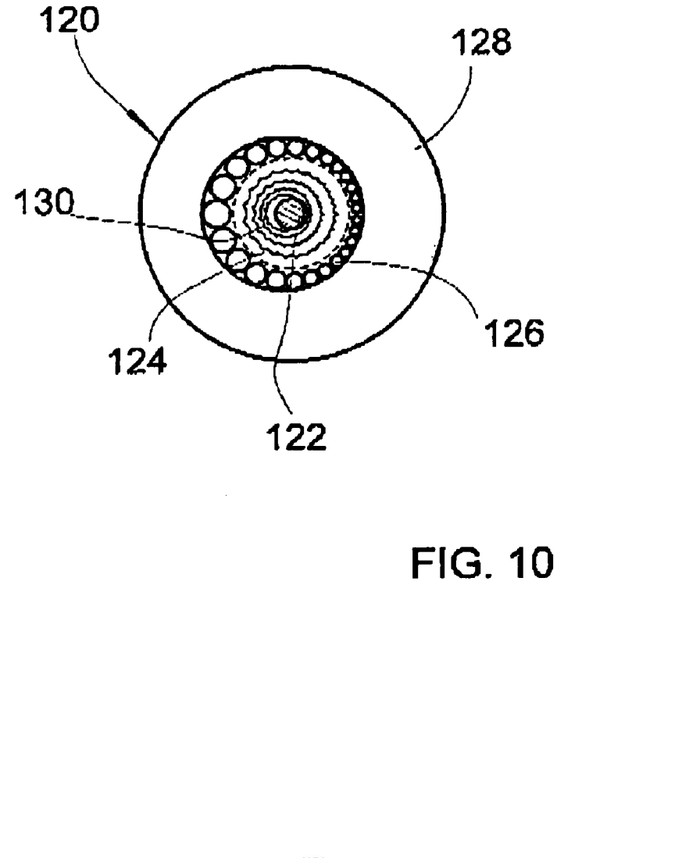
FIG. 10 illustrates a fiber cross-section of an embodiment of the present invention, having a cylindrical core coaxial with the exterior surface of an outermost cladding, and having an eccentric air cladding between the core and the outermost cladding, and also illustrating a modal field distribution pattern.

An embodiment of the present invention is illustrated in the fiber cross-section of FIG. 10, which features an eccentricity whose mathematical center of mass is radially displaced from the axis of the cylindrical outermost cladding. A fiber 120 has a single-mode fiber core 122, a cylindrical inner cladding 124, a non-cylindrical air cladding 126, and an outer cladding 128 whose exterior cylindrical surface is coaxial with fiber core 122. Fiber core 122 may be an Ytterbium-doped fiber. This design has an optimized numerical aperture and an eccentricity of air cladding 126 with respect to fiber core 122. This eccentricity contributes to the efficient mode conversion with a modal field distribution 130 as previously discussed.

Because the exterior surface of outer cladding 128 is coaxial with fiber core 122, it is easy to connect to standard optical transmission fibers. The fabrication of a fiber as shown in FIG. 10 is not complicated, because no special preform preparation is required. The fiber is drawn in a regular manner. In the course of drawing the fiber is surrounded by hollow capillaries of different diameters drawn together with the core. It is noted that larger capillary diameters affect lower non-zero mode orders, whereas the smaller capillary diameters affect higher mode orders. The smallest hollow capillary diameter corresponds to the efficient mode conversion criteria as previously discussed. The largest hollow capillary diameter defines the desired eccentricity of air cladding 126. Capillaries are selected from a discrete set of diameters calculated for a particular cladding diameter, as shown in Table 1, by division on an integer number of capillaries. This allows fabrication of the air cladding with an integral number of capillaries in contact with each other and in contact with inner cladding 124.

Air cladding 126 controls the axial displacement or eccentricity of modal field pattern 130 to achieve the desired concentration of pumping energy in the region of core 122. Unfortunately, the use of eccentric air cladding 126 as shown in FIG. 10 complicates the fabrication of outer cladding 128, because the silica tube from which outer cladding 128 is drawn must have an eccentric inner surface. This manufacturing drawback is eliminated by an air clad fiber design shown in FIG. 11, which illustrates a cross-section of an air-clad fiber with multiple asymmetric inner clad layers designed in accordance with the present invention. In addition to inner air cladding 124, there is an additional air cladding 134. Air cladding 134 is configured and oriented with respect to air cladding 124 in such a way that the outer surface of air cladding 134 is cylindrical and coaxial with respect to the exterior surface of outer cladding 128 and therefore does not require that the inner surface of outer cladding 128 be eccentric. This embodiment features an eccentricity having optical properties which vary according to the azimuthal angle with respect to the fiber axis. It is evident that air cladding 124 in FIG. 11 creates a displaced modal field distribution pattern similar to that shown in FIG. 10. An optical radiation path 136 is established by total internal reflection and the principles of geometric optics.

Figure 11:
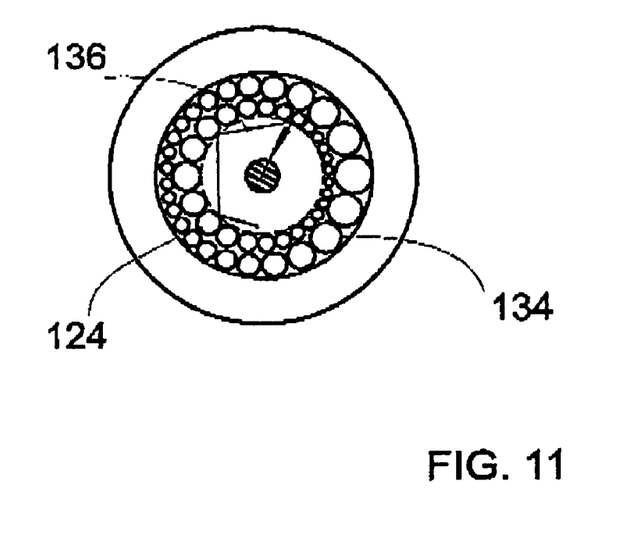
FIG. 11 illustrates a fiber cross-section of an alternative embodiment of the present invention, having two asymmetric eccentric air claddings, and also illustrating a reflected optical ray entering the core.

Fabrication of the fiber shown in FIG. 11 is simple and is similar to the fabrication of the design shown in FIG. 5A. The fiber structure may be further improved by adding a torsion wherein the azimuthal position of the drawn capillaries changes along the axis of the fiber. This will create a helical fiber structure along the length of the fiber, encouraging additional crossings of optical pumping power through the fiber core. Improved and efficient absorption of pumping power allows reducing the length of the laser.

Figure 12:
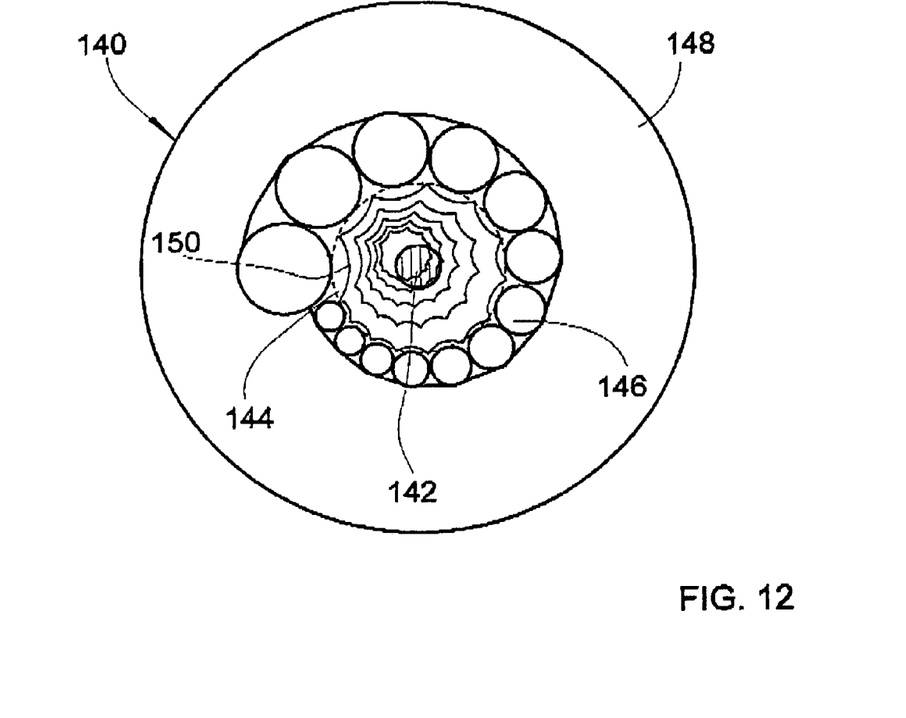
FIG. 12 illustrates a fiber cross-section of another embodiment of the present invention, having a cylindrical fiber core coaxial with the exterior surface of an outermost cladding, and having an asymmetric non-cylindrical air-cladding between the core and the outermost cladding, and also illustrating a modal field distribution pattern.

FIG. 12 shows a fiber cross-section of another embodiment of the present invention involving a non-cylindrical air-cladding, and a cylindrical fiber core coaxial with the exterior surface of a cylindrical outer cladding. A fiber 140 has a single-mode core 142, a cylindrical inner cladding 144 (shown as a dashed line), a non-cylindrical spiral pattern air cladding 146, and an outer cladding 148 whose external surface is coaxial with fiber core 142. Fiber core 142 may be an Ytterbium-doped fiber. This embodiment features an eccentricity in non-cylindrical spiral pattern air cladding 146 whose capillaries have different diameters. This particular design has an optimized numerical aperture and a modal field distribution pattern 150 is offset with respect to fiber core 142. Thus, the form of air cladding 146 contributes to efficient mode conversion and modal field overlap with core 142.

Figure 13:
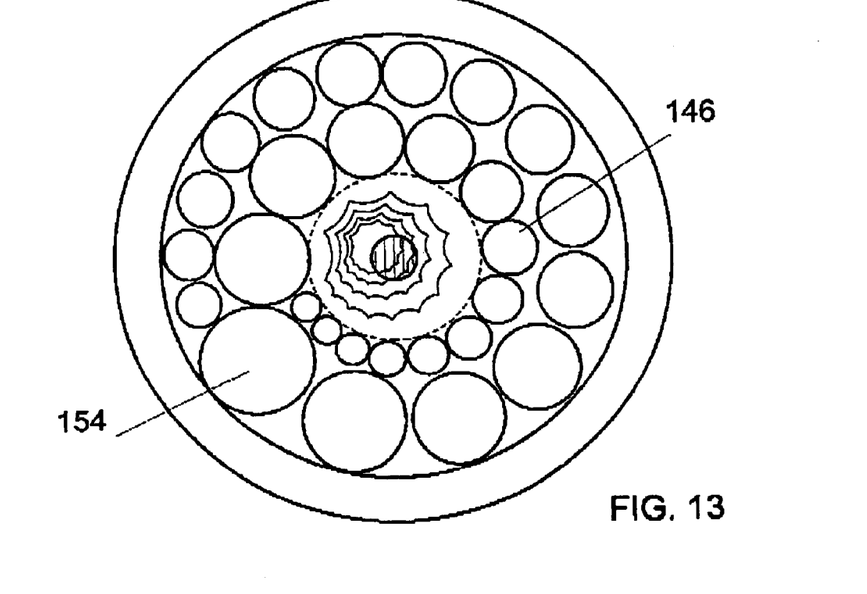
FIG. 13 illustrates a fiber cross-section of an additional embodiment of the present invention, having a cylindrical fiber core coaxial with the exterior surface of an outermost cladding, and having multiple asymmetric air-cladding layers between the core and the outermost cladding, and also illustrating a modal field distribution pattern.

In the embodiment shown in FIG. 12, outer cladding 148 is coaxial with fiber core 142 and hence it is easy to connect such a fiber to a standard coaxial optical transmission channel. Fabrication of such a fiber is similar to the fabrication technique of the design shown in FIG. 5A. Positioning the hollow capillaries is simple, since they are in contact with the outer surface of inner-cladding 144. Using hollow capillaries of gradually growing or gradually diminishing diameters creates the spiral air cladding pattern. The diameters of the capillaries are chosen from Table 1. The non-cylindrical spiral of air cladding 146, however, complicates the fabrication of outer cladding 148, since the silica tube from which outer cladding 148 is drawn must have a corresponding non-cylindrical inner surface. This manufacturing drawback is eliminated by an air clad fiber design shown in FIG. 13, which illustrates a fiber cross-section of an air-clad fiber with multiple asymmetric and non-cylindrical inner clad layers designed in accordance with the present invention. In addition to air cladding 146, there is an additional air cladding 154. Air cladding 154 is configured and oriented with respect to air cladding 146 in such a way that the outer surface of air cladding 154 is cylindrical and coaxial with respect to the exterior surface of the outer cladding and therefore does not require that the inner surface of the outer cladding be non-cylindrical or eccentric. It is evident that the coaxial air cladding creates a displaced modal field distribution pattern similar to that of modal field pattern 150 (FIG. 12). As before, the optical radiation path in the inner cladding and fiber core is established by total internal reflection and the principles of geometric optics.

As before, the condition of Inequality (2) on the refractive indices of the fiber core, inner cladding, and outer cladding applies in this structure also. Further performance improvement is possible by utilizing capillaries forming the air cladding that have a refraction index lower than the inner cladding—$n_{core} > n_{inner\ cladding} > n_{capillary} > n_{outer\ cladding}$.

Fabrication of this fiber design is simple and similar to fabrication of design shown in FIG. 5A. As before, fiber structure may be further improved by adding a torsion with a periodically-changing angular direction to the drawn fiber and capillaries to create a helical air channel structure along the length of the fiber, thereby encouraging additional crossings of optical pumping power through the fiber core. Improved and efficient absorption of pumping power allows reducing the length of the laser.

Figure 14:
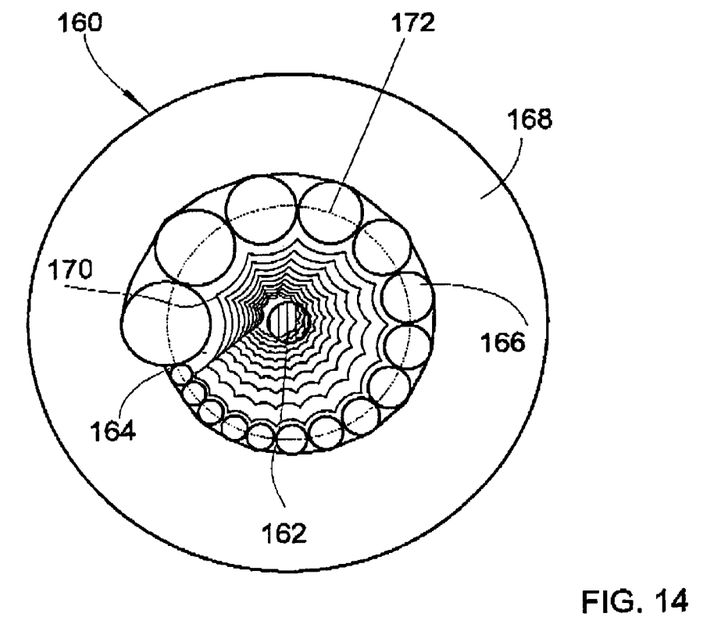
FIG. 14 illustrates a fiber cross-section of a further embodiment of the present invention, having a cylindrical fiber core coaxial with the exterior surface of an outermost cladding, and having an asymmetric non-cylindrical air-cladding between the core and the outermost cladding, and also illustrating a modal field distribution pattern.

FIG. 14 shows a fiber cross-section of a further embodiment of the present invention involving a non-cylindrical air-cladding, and a cylindrical fiber core coaxial with the exterior surface of a cylindrical outer cladding. A fiber 160 has a single-mode core 162, a non-cylindrical inner cladding 164, a non-cylindrical spiral pattern air cladding 166, and an outer cladding 168 whose external surface is coaxial with fiber core 162. Fiber core 162 may be an Ytterbium-doped fiber. This particular design has an optimized numerical aperture and a modal field distribution pattern 170 is offset with respect to fiber core 162. Thus, the form of air cladding 166 contributes to efficient mode conversion and modal field overlap with core 162. It is noted that the difference between the embodiment shown in FIG. 14 and that shown in FIG. 12 is that in the case of FIG. 12 inner cladding 144 is cylindrical (the outer surfaces of the capillaries 146 are tangent to the cylindrical surface of inner cladding 144), whereas in the case of FIG. 14 inner cladding 164 is non-cylindrical (the axes of capillaries 166 are along an imaginary cylindrical surface 172).

Figure 15:
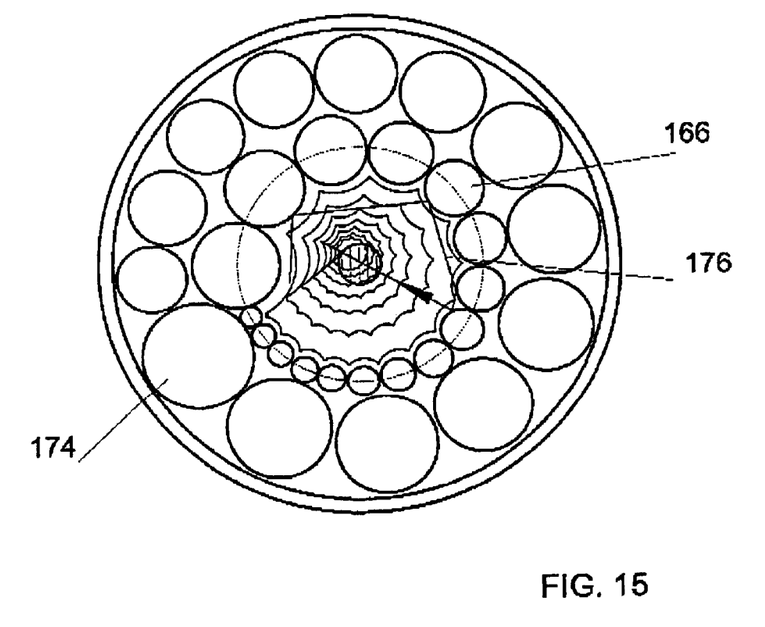
FIG. 15 illustrates a fiber cross-section of yet an additional embodiment of the present invention, having a cylindrical fiber core coaxial with the exterior surface of an outermost cladding, and having multiple asymmetric air-cladding layers between the core and the outermost cladding, and also illustrating a modal field distribution pattern.

In the embodiment shown in FIG. 14, outer cladding 168 is coaxial with fiber core 162 and hence it is easy to connect such a fiber to a standard coaxial optical transmission channel. Fabrication of such a fiber is similar to the fabrication technique of the design shown in FIG. 5A. Positioning the hollow capillaries is simple, since they are in contact with the outer surface of inner cladding 164. Using hollow capillaries of gradually growing or gradually diminishing diameters creates the spiral air cladding pattern. The non-cylindrical spiral of air cladding 166, however, complicates the fabrication and requires auxiliary support assembly manufacturing. This manufacturing drawback is partially alleviated by an air clad fiber design shown in FIG. 15, which illustrates a fiber cross-section of an air-clad fiber with multiple asymmetric and non-cylindrical inner clad layers designed in accordance with the present invention. In addition to air cladding 166, there is an additional air cladding 174. Air cladding 174 is configured and oriented with respect to air cladding 166 in such a way that the outer surface of air cladding 174 is cylindrical and coaxial with respect to the exterior surface of the outer cladding and therefore does not require that the inner surface of the outer cladding be non-cylindrical or eccentric. It is evident that the coaxial air cladding creates a displaced modal field distribution pattern similar to that of modal field pattern 170 (FIG. 14). As before, the optical radiation path in the inner cladding and fiber core is established by total internal reflection and the principles of geometric optics, as indicated by a ray path 176.

Figure 16:
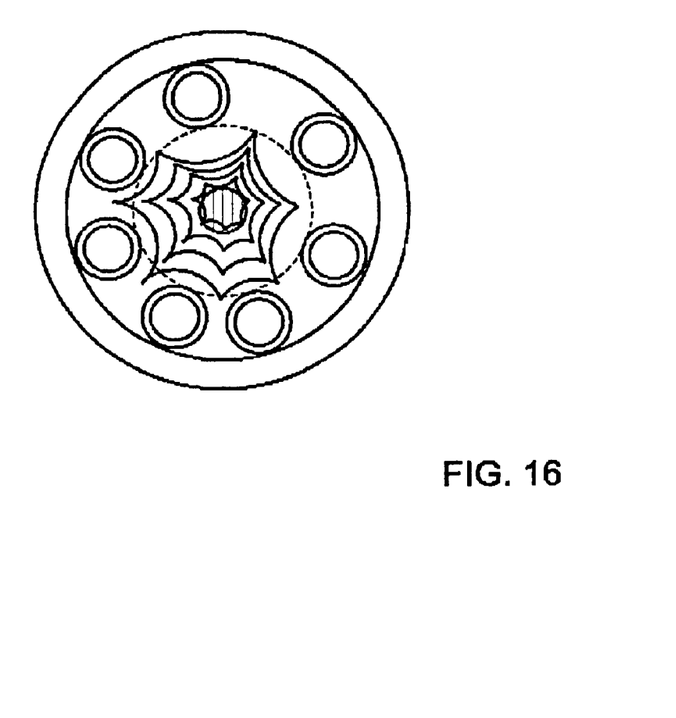
FIG. 16 illustrates a fiber cross-section of still another embodiment of the present invention, having a cylindrical fiber core coaxial with the exterior surface of an outermost cladding, having a symmetric air-cladding layer between the core and the outermost cladding, and having the air-cladding layer constructed of capillaries with random azimuthal spacing.

Similar changes in the modal field distribution pattern may be achieved by fabricating a fiber with irregularly-positioned hollow capillaries. The positions of the capillaries are described with reference to a polar coordinate system associated with the fiber optic structure of a cross-section thereof. In such a coordinate system, each capillary has a unique vector position. As is well known, a vector in polar coordinates has a radial component and an azimuthal component. In addition, there is an azimuthal gap between each pair of capillaries having adjacent azimuthal positions. FIG. 16 illustrates a fiber cross-section of an exemplary embodiment of the present invention having the air cladding layer constructed of capillaries with a random azimuthal gap between each adjacent pair. This embodiment is thus a non-limiting example of an eccentricity whose geometry has a rotational aperiodicity with respect to a polar coordinate system associated with the fiber optic structure or a cross-section thereof. Other examples include, but are not limited to, capillaries having unequal azimuthal gaps between adjacent capillary pairs, such as by: periodic changes of the azimuthal gap between capillaries; monotonic increasing azimuthal gap between capillaries; and monotonic decreasing azimuthal gap between capillaries. It is noted that rotational aperiodicity in the context of the present invention pertains to rotations less than 360°; it is evident that any structure necessarily exhibits periodicity for rotations of integer multiples of 360°, and hence such rotations are explicitly excluded for purposes of defining the present invention.

Figure 17:
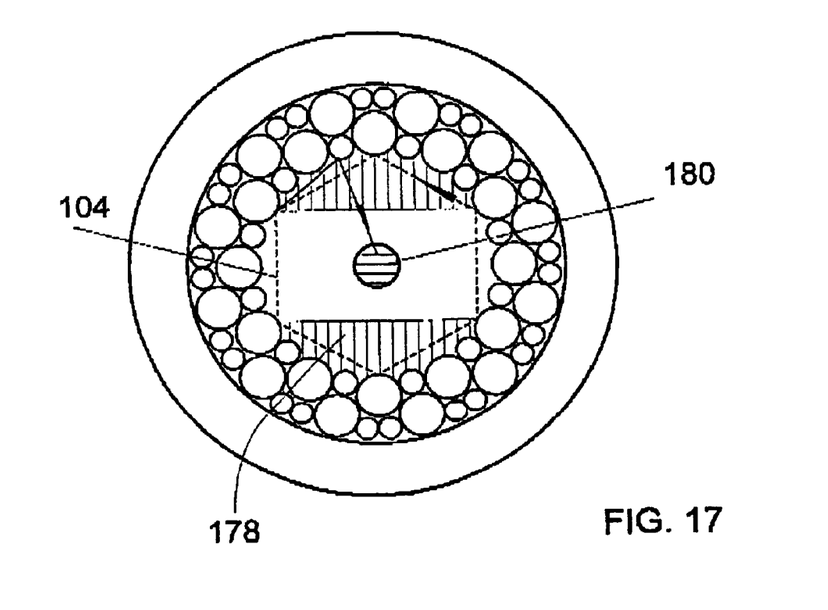
FIG. 17 illustrates a fiber cross-section of an another embodiment of the present invention, having a cylindrical fiber core coaxial with the exterior surface of an outermost cladding, having multiple symmetric air-cladding layers between the core and the outermost cladding, and having an inner cladding with regions of different refraction indices.

The modal field intensity distribution may be further modified by creating regions of different refractive index within the inner cladding. This may be accomplished by making the fiber inner cladding of a photosensitive material whose refractive index may be changed by illumination with UV light. FIG. 17 illustrates a fiber cross-section of still another embodiment of the present invention, having a cylindrical fiber core 180 coaxial with the exterior surface of an outermost cladding, having multiple symmetric air-cladding layers between the core and the outermost cladding, and having an inner cladding with regions of different refraction indices. As noted above, the inner cladding of this fiber is exposed through a mask to UV radiation. A strip 178 produced thereby has an index of refraction slightly higher than the one the rest of the inner cladding. Such regions of differing refractive index further enhance the mode conversion process. It is clear that similar operations may be performed on core 180, although regions of different refractive index are less effective than the such regions within the cladding. This embodiment effectively illustrates how ring propagation mode 104 of FIG. 8 is converted to one that interacts with the fiber core (FIG. 17).

Figure 18:
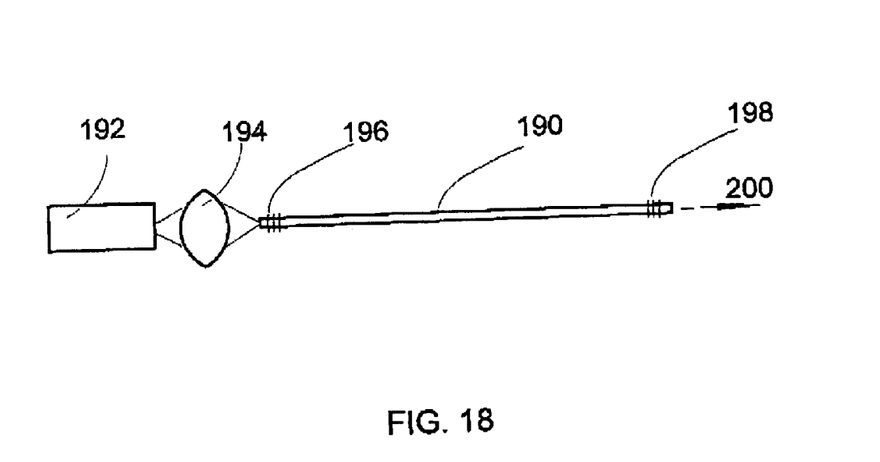
FIG. 18 is a schematic illustration of an Ytterbium doped fiber laser operating at three-level transition according to the present invention.

FIG. 18 is a schematic illustration of an Ytterbium-doped fiber laser operating at the three-level transition according to the present invention. An Ytterbium-doped fiber laser includes an air-clad fiber 190 constructed according to one of the embodiments of present invention. A high-power, high-brightness multi-mode laser pump 192, such as "Super-Focus 1" commercially available from Rayteq Photonic Solutions Ltd., Rehovot, Israel, is coupled to fiber 190 by a conventional optical coupling means 194. Conventional Fiber Bragg Gratings (FBG's) 196 and 198 form the cavity of laser 190, which emits laser radiation 200 at approximately a 980 nanometer wavelength.

While the invention has been described with respect to a limited number of embodiments, it will be appreciated that many variations, modifications and other applications of the invention may be made.

The drawings and specifications set forth a number of embodiments of the invention and, although specific terms are employed and specific features described, the terms and features are used in a generic and descriptive sense only, and not for purpose of limitation. Rather, the scope of the invention is set forth in the following claims.

What is claimed is:

1. A fiber optic structure comprising:
   (a) a cylindrical fiber core with an axis;
   (b) an eccentric inner cladding, wherein said eccentric cladding is an air cladding further comprising a plurality of hollow capillaries, having outer diameters and inner diameters and having radial positions and azimuthal positions relative to a polar coordinate system associated with the fiber optic structure, such that there is an azimuthal gap between each pair of capillaries having adjacent positions, and
   (c) an outer cladding having a cylindrical exterior surface coaxial with said cylindrical fiber core.

2. The fiber optic structure of claim 1, wherein said cylindrical fiber core has a core refractive index, said eccentric inner cladding has an inner cladding refractive index, said hollow capillaries have a capillary refractive index, and said outer cladding has an outer cladding refractive index; and wherein said core refractive index is greater than said inner cladding refractive index; said inner cladding index is greater than said capillary refractive index; and said capillary refractive index is greater than said outer cladding refractive index.

3. The fiber optic structure of claim 1, wherein said outer diameters are not all equal.

4. The fiber optic structure of claim 1, wherein said inner diameters are not all equal.

5. The fiber optic structure of claim 1, wherein said radial positions are not all equal.

6. The fiber optic structure of claim 1, wherein said azimuthal gaps increase monotonically.

7. The fiber optic structure of claim 1, wherein said azimuthal gaps decrease monotonically.

8. The fiber optic structure of claim 1, further having helical air channels.

* * * * *